US008743323B2

(12) United States Patent
Matsushima et al.

(10) Patent No.: US 8,743,323 B2
(45) Date of Patent: Jun. 3, 2014

(54) TRANSMISSIVE LIQUID CRYSTAL DISPLAY PANEL COMPRISING A SUBPIXEL FOR DISPLAY AND A SUBPIXEL FOR CONTROL OF A VIEW ANGLE WHEREIN A LIGHT BLOCKING MEMBER IS FORMED IN A CENTRAL POSITION OF EACH OF A PLURALITY OF SLIT-LIKE OPENINGS

(75) Inventors: Toshiharu Matsushima, Tottori (JP); Aya Yoso, Tottori (JP)

(73) Assignee: Japan Display West Inc., Chita-Gun, Aichi-Ken (JP)

(*) Notice: Subject to any disclaimer, the term of this patent is extended or adjusted under 35 U.S.C. 154(b) by 154 days.

(21) Appl. No.: 13/014,824

(22) Filed: Jan. 27, 2011

(65) Prior Publication Data

US 2011/0187950 A1 Aug. 4, 2011

(30) Foreign Application Priority Data

Feb. 1, 2010 (JP) ................ P2010-020001

(51) Int. Cl.
*G02F 1/1333* (2006.01)
*G02F 1/1337* (2006.01)
*G02F 1/1343* (2006.01)

(52) U.S. Cl.
USPC ............................ 349/110; 349/132; 349/141

(58) Field of Classification Search
USPC ......................................... 349/110, 132, 141
See application file for complete search history.

(56) References Cited

U.S. PATENT DOCUMENTS

| 2004/0160555 | A1* | 8/2004 | Nemoto et al. | 349/113 |
| 2007/0176872 | A1 | 8/2007 | Kazuyoshi et al. | |
| 2009/0180062 | A1* | 7/2009 | Kim | 349/106 |
| 2009/0201455 | A1* | 8/2009 | Murai | 349/139 |
| 2009/0231530 | A1 | 9/2009 | Nishimura | |
| 2009/0237594 | A1* | 9/2009 | Matsushima | 349/62 |

FOREIGN PATENT DOCUMENTS

| JP | 5-108023 | 4/1993 |
| JP | 2007-178736 | 7/2007 |
| JP | 2009-222747 | 10/2009 |

* cited by examiner

*Primary Examiner* — Paul Lee
(74) *Attorney, Agent, or Firm* — K&L Gates LLP (57) ABSTRACT

A liquid crystal display panel includes: a first substrate and a second substrate disposed so as to face each other with a liquid crystal layer being held between the first substrate and the second substrate, a first electrode and a second electrode across which an electric field is applied to the liquid crystal layer being formed on the first substrate, a subpixel for display and a subpixel for control of a view angle being disposed on the same electrode, in which a plurality of slit-like openings are formed in the second electrode in the subpixel for control of a view angle, and a light blocking member is formed in a central position of a width of each of the plurality of slit-like openings in terms of planar view.

8 Claims, 10 Drawing Sheets

TRANSMISSIVE LIQUID CRYSTAL DISPLAY PANEL COMPRISING A SUBPIXEL FOR DISPLAY AND A SUBPIXEL FOR CONTROL OF A VIEW ANGLE WHEREIN A LIGHT BLOCKING MEMBER IS FORMED IN A CENTRAL POSITION OF EACH OF A PLURALITY OF SLIT-LIKE OPENINGS

CROSS REFERENCES TO RELATED APPLICATIONS

The present application claims priority to Japanese Priority Patent Application JP 2010-020001 filed in the Japan Patent Office on Feb. 1, 2010, the entire content of which is hereby incorporated by reference.

BACKGROUND

The present invention relates to a liquid crystal display panel using a transverse electric field system and including a subpixel for control of a view angle, and an electronic apparatus using the same. More particularly, the invention relates to a liquid crystal panel in which a subpixel for control of a view angle also operates in accordance with a transverse electric field system, and an electronic apparatus using the same.

A liquid crystal display panel is used as a display panel in many electronic apparatuses because the liquid crystal display panel has the features such as light weight, slimness and low power consumption as compared with a Cathode Ray Tube (CRT). The liquid crystal display panel is such that an alignment of liquid crystal molecules arranged in a predetermined direction is changed by application of an electric field to change an amount of light transmitted through a liquid crystal layer, thereby displaying an image on the liquid crystal display panel. With regard to such a liquid crystal display panel, reflection type one, transmission type one, and semi-transmission type one including both the reflection type one and the transmission type one exist. In this case, in the reflection type liquid crystal display panel, an outside light is made incident to a liquid crystal layer, and is reflected by a reflective plate to be transmitted through the liquid crystal layer again to be emitted. Also, in the transmission type liquid crystal display panel, an incident light radiated from a backlight unit is transmitted through a liquid crystal layer.

A longitudinal electric field system and a transverse electric field system are known as those used in a method of applying an electric field to a liquid crystal layer of the liquid crystal display panel. With the liquid crystal display panel using the longitudinal electric field system, an electric field directed approximately in the longitudinal direction is applied to liquid crystal molecules through a pair of electrodes disposed so as to hold the liquid crystal layer between the paired electrodes. A liquid crystal display panel having a Twisted Nematic (TN) mode, a liquid crystal display panel having a Vertical Alignment (VA) mode, a liquid crystal display panel having a Multi-domain Vertical Alignment (MVA) mode or the like is known as the liquid crystal display panel using the longitudinal electric field system. With the liquid crystal display panel using the transverse electric field system, a pair of electrodes is provided in an inner surface side of one of a pair of substrates disposed so as to hold the liquid crystal layer between the paired substrates with the paired electrodes being insulated from each other. Also, an electric field directed approximately in the transverse direction is applied to the liquid crystal molecules. A liquid crystal display panel having an In-Plane Switching (ISP) mode in which a pair of electrodes does not overlap in terms of planar view, and a liquid crystal display panel having a Fringe Field Switching (FFS) mode in which a pair of electrodes overlaps in terms of planar view are known as the liquid crystal display panel using the transverse electric field system.

Of them, in the liquid crystal display panel having the IPS mode, a pair of electrodes composed of a pixel electrode and a common electrode is formed in a pectinate shape so that the paired electrodes are engaged with each other with the paired electrodes being electrically insulated from each other. Also, the transverse electric field is applied across the pixel electrode and the common electrode. The liquid crystal display device having the IPS mode has such an advantage that its view angle is wider than that of the liquid crystal display device having the longitudinal electric field.

In addition, in the liquid crystal display panel having the FFS mode, a pair of electrodes is composed of an upper electrode and a lower electrode. Also, the paired upper and lower electrodes are disposed in different layers, respectively, through an insulating film. A slit-like opening is provided in the upper electrode, and the electric field directed approximately in the transverse direction and passing through the slit-like opening is applied to the liquid crystal layer. The liquid crystal display panel having the FFS mode has been used recently in many cases because the liquid crystal display panel having the FFS mode has an effect that the wide view angle can be obtained and also the image contrast can be improved.

Although as described above, the liquid crystal display panel using the transverse electric field system has the wide view angle, when secret information which is not desired to be peeped is displayed, for the purpose of preventing the secret information from being visibly recognized by anyone else, it is preferable to use the narrow view angle other than the wide view angle. Then, as described in Japanese Patent Laid-Open No. Hei 5-108023, there is known a method of controlling view angle characteristics by adding a liquid crystal panel for control of a view angle to a liquid crystal panel for display. However, this method involves such a problem that the addition of the liquid crystal panel for control of a view angle results in a large increase in thickness of the liquid crystal display panel. In order to cope with this problem, as described in Japanese Patent Laid-Open Nos. 2007-178736 and 2009-222747 (hereinafter referred to as Patent Documents 1 and 2), there is known a method of adding a subpixel for control of a view angle in addition to subpixels for display of Red (R), Green (G) and Blue (B), and controlling a voltage applied to the subpixel for control of a view angle, thereby controlling view angle characteristics.

Here, a structure of the liquid crystal display panel, having the FFS mode, to which the subpixel for control of a view angle disclosed in Patent Documents 1 and 2 is added will now be described with reference to FIG. 9. It is noted that FIG. 9 is a top plan view showing an outline of an array substrate for one pixel of the existing liquid crystal display panel, having the FFS mode, to which the subpixel for control of a view angle is added.

Figure 9:
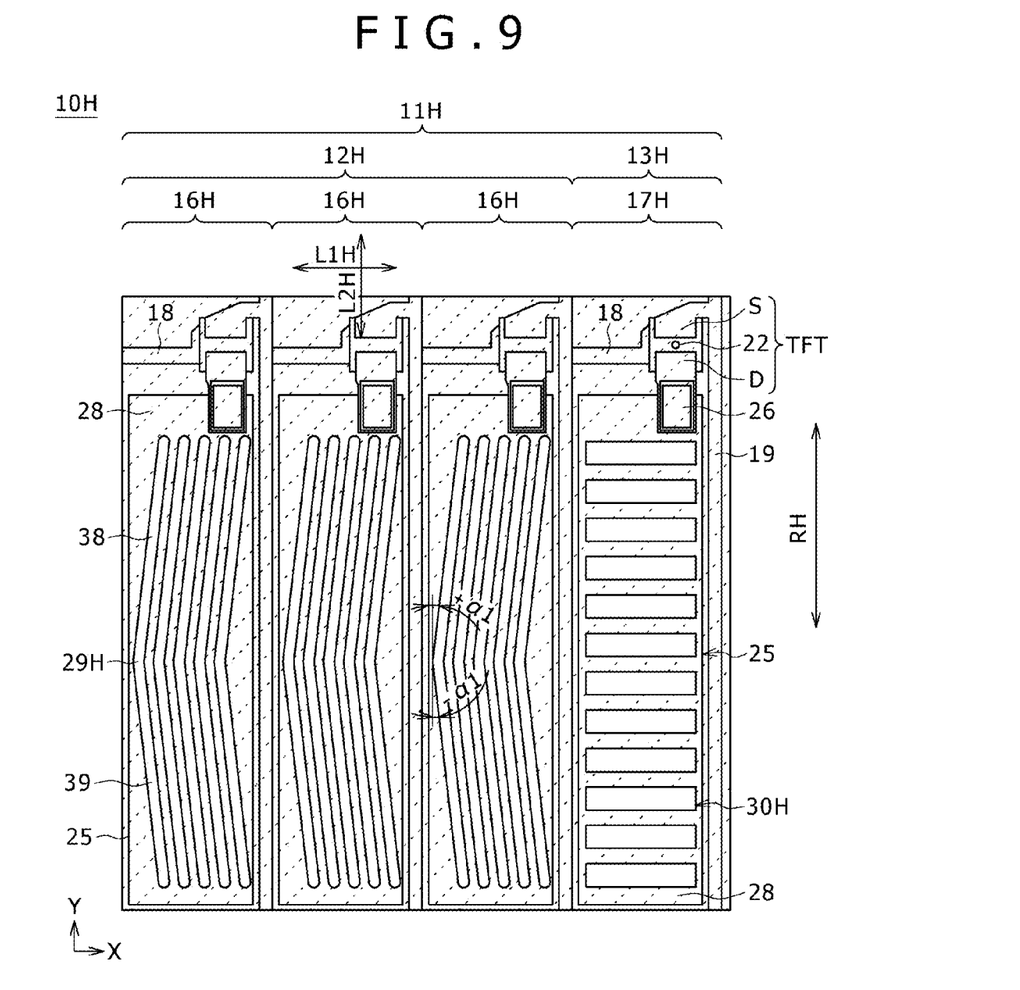
FIG. 9 is a top plan view showing an outline of an existing array substrate for one pixel.

As shown in FIG. 9, one pixel 11H of a liquid crystal display panel 10H is composed of a display region 12H and a view angle control region 13H disposed adjacent to the display region 12H. The display region 12H is composed of three subpixels 16H for display of R, G and B. Also, a color of corresponding one of the pixels is determined based on a mixed color of lights having R, G and B, respectively. The view angle control region 13H includes one subpixel 17H for control of a view angle. An upper electrode 28 of the liquid crystal display panel 10H operates as a common electrode in this case, and is formed over all the pixels. In addition, a low electrode 25 of the liquid crystal display panel 10H operates as a pixel electrode, and is formed every subpixel 16H for display and pixel 17H for control of a view angle.

Also, a first slit-like opening 29H having a dogleg shape is formed in the upper electrode 28 of the display region 12H. An alignment film (not shown) is formed on a surface of the upper electrode 28 and an inner surface of the first slit-like opening 29H. The alignment film is subjected to a rubbing treatment in the same direction as an extension direction (a Y-axis direction in FIG. 9) of a signal line 19. The first slit-like opening 29H is composed of a first subslit-like opening 38 which is inclined with respect to the rubbing treatment direction by +α, and a second subslit-like opening 39 which is inclined with respect to the rubbing treatment direction by −α. A second slit-like opening 30H which extends in a direction vertical to the rubbing treatment direction is formed in the upper electrode 28 of the view angle control region 13H.

As described in Patent Document 2, in the liquid crystal display panel 10H, when a drive voltage is applied across the upper electrode 28 and the lower electrode 25, liquid crystal molecules in the view angle control region 13H are each inclined with respect to a surface of an array substrate. Therefore, although there is no influence of the view angle control in a direct vision direction for the front of the liquid crystal display panel 10H, since the contrast becomes deteriorated due to light leakage in an oblique vision direction, an image displayed becomes difficult to see. As a result, it is possible to offer the view angle control effect.

SUMMARY

Figure 10:
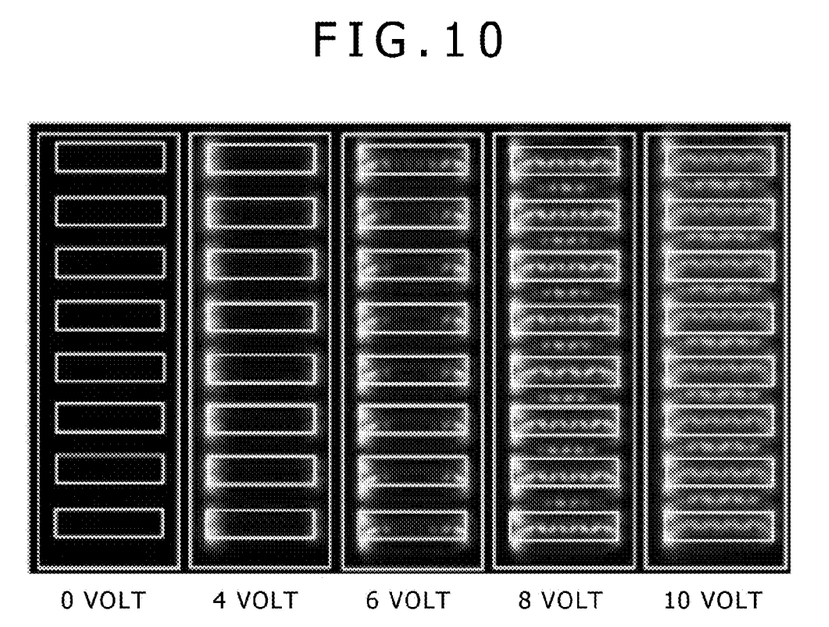
FIG. 10 is a top plan view showing light leakage in an existing view angle subpixel.

However, in the existing liquid crystal display panel 10H, in a central portion of the second slit-like opening 30H and a central portion of a width between the second slit-like openings 30H in the view angle control region 13H, a direction of the electric field in an ON phase of the electric field becomes vertical to that of the liquid crystal molecules in an OFF phase of the electric field. Therefore, a rotational direction of the liquid crystal molecules is hardly determined. For this reason, as shown in FIG. 10, as the applied voltage is increased, the light leakage is generated in the central portion of the second slit-like opening 30H, and in the central portion of the width between the second slit-like openings 30H in the direct vision direction. The light leakage in the view angle control region is similarly generated in the liquid crystal display panel as well having the IPS mode.

The present invention has been made in order to solve the problems involved in the related art, and it is therefore desirable to provide a liquid crystal display panel, using a transverse electric field system having an FFS mode or an IPS mode, and including a subpixel for control of a view angle, which is excellent in view angle control function because light leakage in a direct vision direction is reduced when the view angle control is carried out, and an electronic apparatus using the same.

In order to attain the desire described above, according to an embodiment, there is provided a liquid crystal display panel including: a first substrate and a second substrate disposed so as to face each other with a liquid crystal layer being held between said first substrate and said second substrate, a first electrode and a second electrode across which an electric field is applied to the liquid crystal layer being formed on the first substrate, a subpixel for display and a subpixel for control of a view angle being disposed on the same pixel, in which a plurality of slit-like openings are formed in the second electrode in the subpixel for control of a view angle, and a light blocking member is formed in a central position of a width of each of the plurality of slit-like openings in terms of planar view.

In the liquid crystal display panel according to the embodiment, since both the first electrode and the second electrode are formed on the first substrate, both the subpixel for display, and the subpixel for control of a view angle operate in accordance with the transverse electric field system. Also, in the liquid crystal panel of the embodiment, a rotational direction of liquid crystal molecules is hardly determined in a portion in which a direction of the electric field in an ON phase of the electric field is vertical to that of the liquid crystal molecules in an OFF phase of the electric field, especially, in the central portion of the width of the slit-like opening in the second electrode through which the electric field is applied to the liquid crystal layer in the subpixel for control of a view angle for carrying out the control of the view angle in accordance with which the light leakage is obliquely generated for the control of the view angle. For this reason, the light leakage may be generated in the subpixel for control of a view angle in a direct vision direction depending on the magnitude of the voltage applied across the first electrode and the second electrode. According to the liquid crystal display panel of the embodiment, since the light blocking member is formed in the central position of the width of each of the slit-like openings in the second electrode in terms of the planar view in the subpixel for control of a view angle, it is possible to reduce the light leakage in the direct vision direction.

In the liquid crystal display panel of the embodiment, preferably, the light blocking member is formed in a central position as well of a width of the second electrode in terms of planar view.

When the slit-like openings are formed in the second electrode, the central position of the width of the second electrode between the slit-like openings is also a region in which a rotational direction of the liquid crystal molecules is hardly determined. Therefore, the light leakage may be generated in the direct vision direction as well in the subpixel for control of a view angle depending on the magnitude of the voltage applied across the first electrode and the second electrode. In the liquid crystal display panel of the embodiment, since the light blocking member is formed in the central position as well of the width of the second electrode in terms of the planar view, it is possible to further block the light leakage in the subpixel for control of a view angle.

In addition, in the liquid crystal display panel of the embodiment, preferably, the first electrode is formed on a lower side of the first substrate through an insulating layer, and the second electrode is formed on an upper side of the first substrate.

According to the liquid crystal display panel of the embodiment, the liquid crystal display panel, using the FFS mode, which has the wide view angle and a high luminance is obtained while the effect described above is offered.

In addition, in the liquid crystal display panel of the embodiment, preferably, a thin film transistor (TFT) for driving either the first electrode or the second electrode is formed on the first substrate, and the light blocking member is formed in the same layer as that of either a source electrode or a gate electrode of the thin film transistor.

According to the liquid crystal display panel of the embodiment, since the light blocking member can be formed in the same process as that for either the source electrode or the gate electrode of the TFT, it is unnecessary to add a process for forming the light blocking member. In addition thereto, since the light blocking member is formed on the first substrate (array substrate), even if position shift is caused when the first substrate and the second substrate (color filter substrate) are stuck to each other, any of the positions between the light blocking member, and the first electrode and the second electrode is prevented from being shifted.

In addition, in the liquid crystal display panel of the embodiment, preferably, a light blocking layer is formed on the second substrate, and the light blocking member is formed in the same layer as that of the light blocking layer.

The light blocking layer referred to as a black matrix is formed on the second substrate (color filter substrate) of the liquid crystal display panel. According to the liquid crystal display panel of the embodiment, since the light blocking member can be formed in the same process as that for the light blocking layer of the second substrate, it is unnecessary to especially add a process for forming the light blocking member.

In addition, according to the liquid crystal display panel of the embodiment, preferably, a length of the light blocking member in a position where corresponding one of the slit-like openings of the second electrode is longer than that of the light blocking member formed on a surface between corresponding ones of the slit-like openings of the second electrode.

A length of the light leakage in the position where the corresponding one of the slit-like openings of the second electrode of the subpixel for control of a view angle is formed is longer than that of the light leakage in the position of the surface between the corresponding ones of the slit-like openings of the second electrodes. Therefore, in the liquid crystal display panel of the embodiment, the length of the light blocking member in the position where the corresponding one of the slit-like openings of the second electrode is formed is made longer than that of the light blocking member formed on the surface between the corresponding ones of the slit-like openings of the second electrode. As a result, it is possible to effectively carry out the control of the view angle, and it is also possible to further enhance the effect of preventing the light leakage in the direct vision direction.

According to another embodiment, there is provided an electronic apparatus including the liquid crystal display panel according to the embodiment.

Additional features and advantages are described herein, and will be apparent from the following Detailed Description and the figures.

DETAILED DESCRIPTION

Embodiments of the present application will be described below in detail with reference to the drawings.

However, embodiments which will be described below are not intended to limit the present invention to the contents described herein, and thus the present invention is equally applied to various kinds of changes made without departing from the technical idea disclosed in the appended claims. In addition, in the drawings used for the description in this specification, for the purpose of drawing layers and members in such sizes that they can be recognized on the drawings, the layers and the members are drawn on different scale sizes, respectively, and thus are not necessarily drawn in proportion to their actual sizes.

1. First Embodiment

Figure 2:
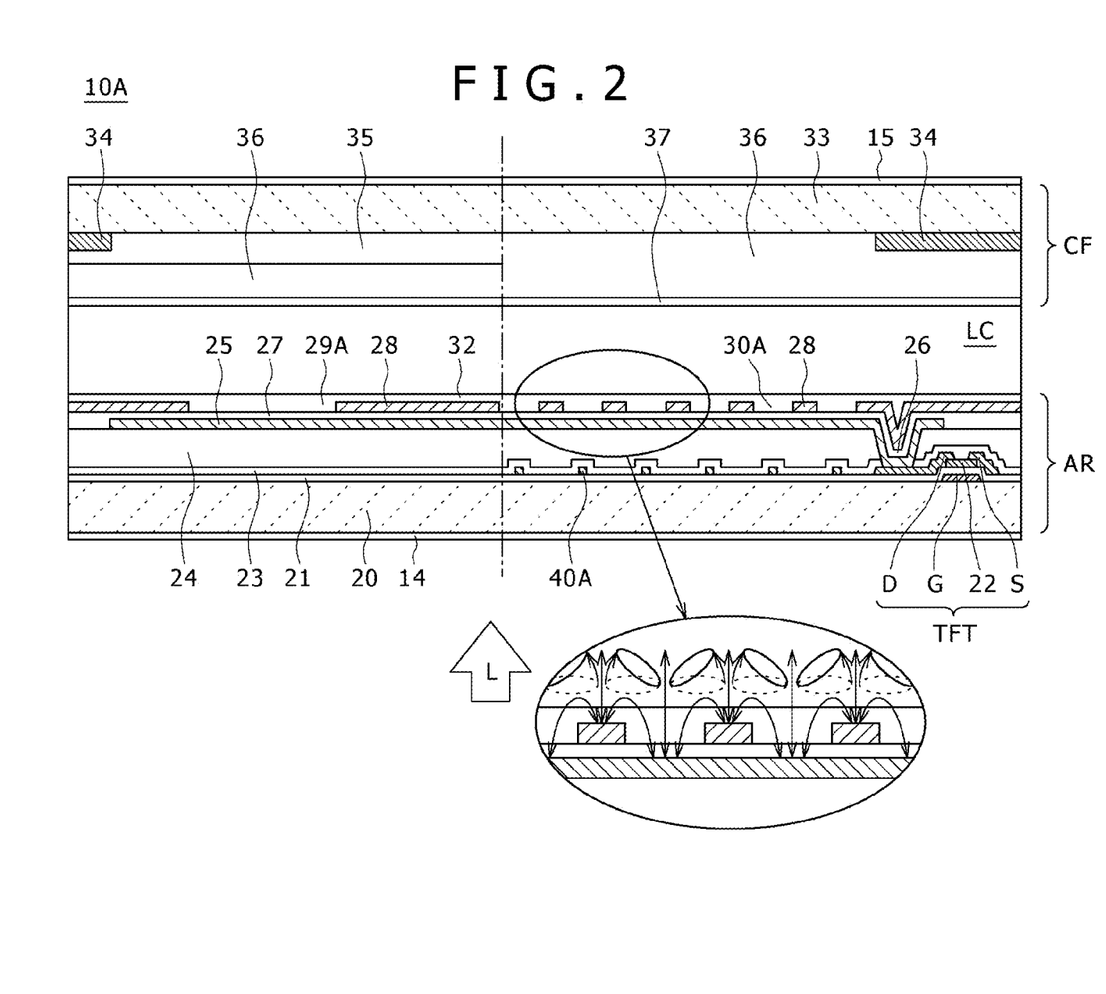
FIG. 2 is a cross sectional view taken on line II-II of FIG. 1.
Figure 3:
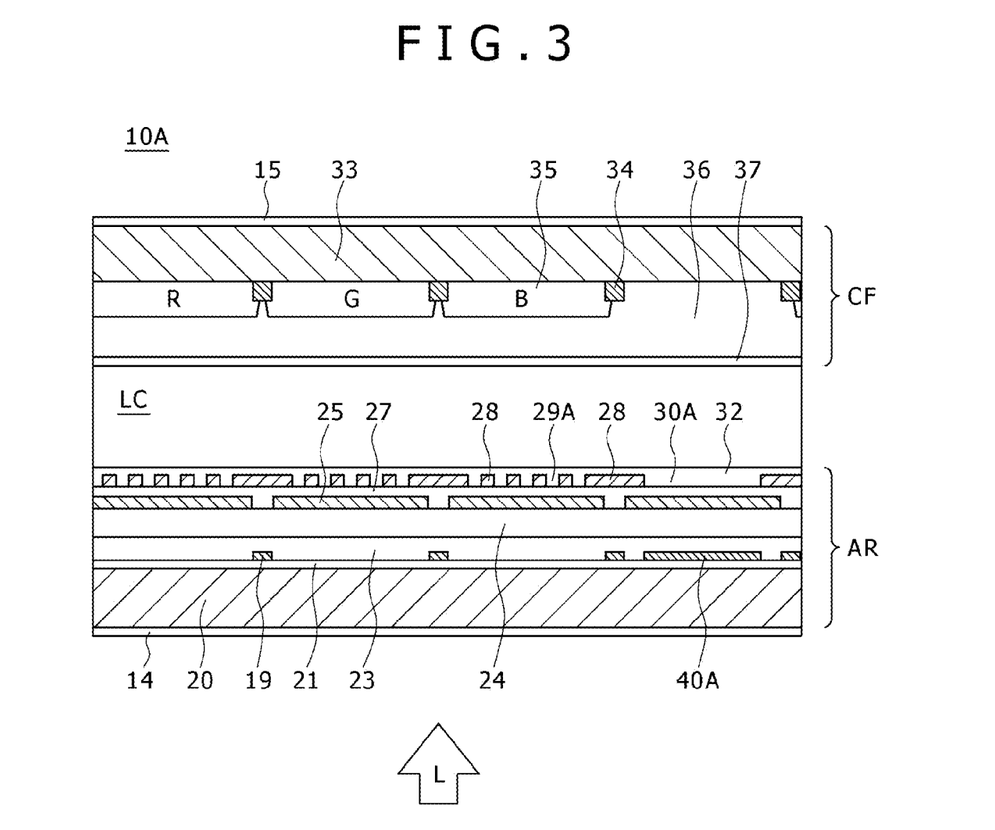
FIG. 3 is a cross sectional view taken on line of FIG. 1.

A structure of a main portion of a liquid crystal display panel 10A according to a first embodiment will now be described with reference to FIGS. 1 to 3. The liquid crystal display panel 10A of the first embodiment includes a display region 12A complying with an FFS mode for color display, and a view angle control region 13A complying with the FFS mode in each of pixels 11A. As shown in FIGS. 2 and 3, in the liquid crystal display panel 10A, a liquid crystal layer LC is held between an array substrate AR and a color filter substrate CF. Also, a first polarizing plate 14 is provided on an outer surface of the array substrate AR on a side opposite to the liquid crystal layer LC, and a second polarizing plate 15 is provided on an outer surface of the color filter substrate CF on a side opposite to the liquid crystal layer LC. In the liquid crystal display panel 10A of the first embodiment, the first polarizing plate 14 and the second polarizing plate 15 are mutually disposed in a cross-Nicol fashion, and operate in a normally black mode.

Figure 1:
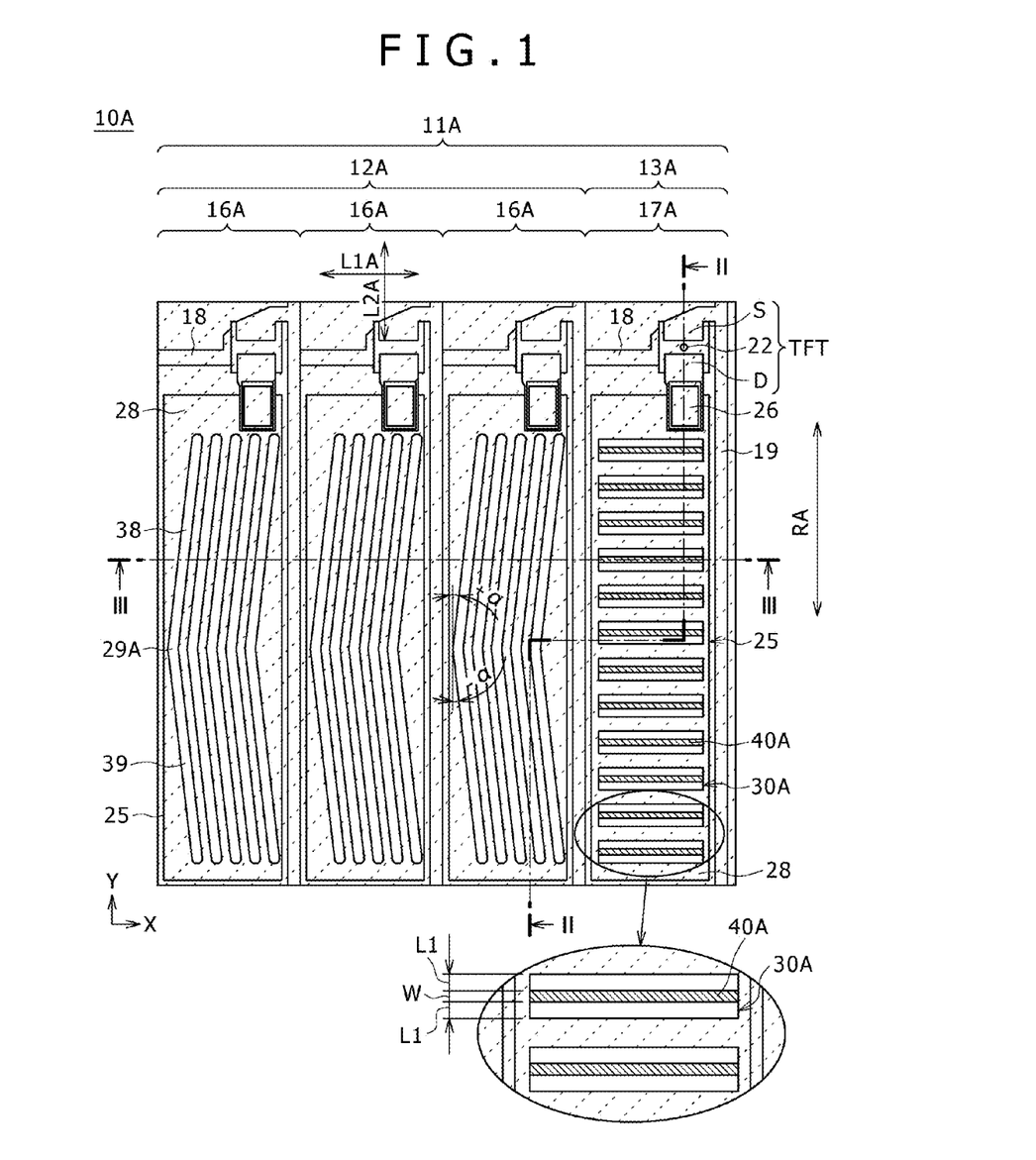
FIG. 1 is a top plan view showing an outline of an array substrate for one pixel in a liquid crystal display panel according to a first embodiment.

The liquid crystal display panel 10A has a plurality of pixels 11A disposed in a row direction (in an X-axis direction in FIG. 1), and in a column direction (in a Y-axis direction in FIG. 1). As shown in FIG. 1, one pixel 11A is composed of a display region 12A, and a view angle control region 13A disposed adjacent to the display region 12A. The display region 12A, for example, is composed of three subpixels 16A for display of three colors of Red (R), Green (G) and Blue (B). Also, a color of corresponding one of the pixels 11A is determined based on a mixed color of lights having R, G and B, respectively. The view angle control region 13A includes one subpixel 17A for control of a view angle.

Each of the subpixel 16A for display, and the subpixel 17A for control of a view angle in the array substrate AR includes a scanning line 18, a signal line 19, and a thin film transistor TFT. In this case, the scanning line 18 is made of an opaque metal such as aluminum or molybdenum, and extends in the row direction. The signal line 19 is made of an opaque metal such as aluminum or molybdenum, and extends in the column direction. Also, the thin film transistor TFT is disposed in the vicinity of an intersection portion between the scanning line 18 and the signal line 19. It is noted that the thin film transistor TFT of the subpixel 16A for display, and the thin film transistor TFT of the subpixel 17A for control of a view angle have the same structure.

The array substrate AR has a first transparent substrate 20, for example, made of a glass, quartz, a plastic or the like which is transparent and has an insulating property as a base. The scanning line 18 is formed on a side of the first transparent substrate 20 facing the liquid crystal layer LC, and a gate electrode G is disposed so as to extend from corresponding one of the scanning lines 18. A transparent gate insulating film 21, for example, made of a silicon nitride, a silicon oxide or the like is laminated so as to cover both the scanning line 18 and the gate electrode G. Also, a semiconductor layer 22, for example, made of amorphous silicon, polycrystalline silicon or the like is formed on the gate insulating film 21 overlapping the gate electrode G in terms of planar view.

In addition, a plurality of signal lines 19 each, for example, made of a metal such as aluminum or molybdenum are formed on the gate insulating film 21 in the column direction. Regions which are measured by these scanning lines 18 and signal lines 19 become subpixel regions, respectively. A source electrode S is disposed so as to extend from corresponding one of the signal lines 19, and partially contacts a surface of the semiconductor layer 22.

In addition, a drain electrode D which is formed from the same material as that of each of the signal lines 19 concurrently with each of the signal lines 19 is provided on the gate insulating film 21. The drain electrode D is disposed close to the source electrode S and partially contacts the surface of the semiconductor layer 22. The three subpixels 16A for display of R, G and B compose the display region 12A having approximately a square shape of one pixel 11A. Thus, each of the subpixels 16A for display which are obtained by trisecting the display region 12A has a rectangular shape in which the scanning line 18 side is a short side, and the signal line 19 side is a long side. The thin film transistor TFT serving as a switching element is composed of the gate electrode G, the gate insulating film 21, the semiconductor layer 22, the source electrode S, and the drain electrode D.

In addition, a transparent passivation film 23, for example, made of a silicon nitride, a silicon oxide or the like is laminated so as to cover exposed portions of the signal line 19, the thin film transistor TFT and the gate insulating film 21. Also, an interlayer resin film 24, for example, made of a transparent resin material such as a photo resist is laminated so as to cover the passivation film 23. The interlayer resin film 24 planarizes an irregular surface of the passivation film 23 caused by the signal line 19, the thin film transistor TFT and the gate insulating film 21.

Also, a lower electrode 25 (corresponding to a first electrode in the present invention), for example, made of a transparent conductive material such as an Indium Tin Oxide (ITO) or an Indium Zinc Oxide (IZO) is formed so as to cover the interlayer resin film 24. A contact hole 26 is formed so as to completely extend through both the interlayer resin film 24 and the passivation film 23 to reach the drain electrode D. The lower electrode 25 and the drain electrode D are electrically connected to each other through the contact hole 26. For this reason, the lower electrode 25 operates as the pixel electrode.

A transparent interelectrode insulating film 27, for example, made of a silicon nitride, a silicon oxide or the like is laminated so as to cover the lower electrode 25. Also, an upper electrode 28 (corresponding to a second electrode in the present invention), for example, made of a transparent conductive material such as an ITO or an IZO is formed so as to cover the interelectrode insulating film 27. The upper electrode 28 is formed over the pixels 11A, and is electrically connected to a common wiring (not shown). For this reason, the upper electrode 28 operates as a common electrode.

As shown in FIG. 1, a plurality of first slit-like openings 29A are formed in the upper electrode 28 in the subpixel 16A for display. Also, a plurality of second slit-like openings 30A are formed in the upper electrode 28 in the subpixel 17A for control of a view angle. After a photo resist material applied onto the surface of the upper electrode 28 is exposed and developed by using a photolithography method, the selective etching is carried out by using the resulting photo resist material as an etching mask, thereby forming these first and second slit-like openings 29A and 30A. Also, a first alignment film 32, for example, made of polyimide is laminated so as to cover both the upper electrode 28 and inner surfaces of the first and second slit-like openings 29A and 30A. The first alignment film 32 is subjected to a rubbing treatment. When no electric field is applied to the liquid crystal layer LC, the liquid crystal molecules are got in a line in a rubbing treatment direction.

The color filter substrate CF has a second transparent substrate 33, for example, made of a glass, quartz, a plastic or the like which is transparent and has an insulating property as a base. A light blocking layer 34, for example, having a light blocking property is formed in a position facing the opaque scanning line 18, the signal line 19, and the thin film transistor TFT of the array substrate AR on the surface on the liquid crystal layer LC side of the second transparent substrate 33. Also, color filter layers 35 which transmit lights having different colors (R, G and B), respectively, are formed in the three subpixels 16A for display, respectively. As shown in FIG. 3, no color filter layer 35 is formed in the subpixel 17A for control of a view angle.

Also, an overcoat layer 36, for example, made of a transparent resin material such as a photo resist is laminated so as to cover both the light blocking layer 34 and the color filter layer 35. The overcoat layer 36 of the color filter substrate CF is formed for the purpose of planarizing stepped portions caused by the color filter layers 35 having the different colors, respectively, and blocking an impurity from the light blocking layer 34 or the color filter layer 35 so as for such an impurity not to enter the liquid crystal layer LC. Also, a second alignment film 37, for example, made of polyimide is formed so as to cover the overcoat layer 36. The second alignment film 37 is subjected to the rubbing treatment whose direction is either parallel with or the orthogonal to each of optical axes of the first and second polarizing plates 14 and 15.

Next, a detailed description will be given with respect to the first slit-like opening 29A of the upper electrode 28 in the subpixel 16A for display, the second slit-like opening 30A of the upper electrode 28 in the subpixel 17A for control of a view angle, and the direction of the rubbing treatment. As shown in FIG. 1, the first slit-like opening 29A is formed in a dogleg shape so as to extend in an extension direction of the signal line 19. Since the subpixel 16A for display is vertically long, when the first slit-like openings 29A are made to transversely extend, the number of both ends of the first slit-like openings 29A increases. An end portion of the first slit-like opening 29A becomes an abnormal alignment region. Then, in the liquid crystal display panel 10A of the first embodiment, the extension direction of the first slit-like opening 29A is set as a longitudinal direction, whereby the number of end portions of the first slit-like openings 29A is reduced and a decrease in aperture ratio is reduced.

In addition, the first slit-like opening 29A having the dog-leg shape is composed of a first subslit-like opening 38 which is inclined with respect to the extension direction of the signal line 19 by +α (a clockwise direction is set as being positive, and α is taken to be positive), and a second subslit-like opening 39 which is inclined with respect to the extension direction of the signal line 19 by −α. Although α differs depending on various kinds of conditions, preferably, α is in the range of 3° to 15°. When all the first slit-like openings 29A are inclined either in the clockwise direction or in the counterclockwise direction with respect to the direction of the rubbing treatment, a phenomenon appear such that a color changes depending on viewing angles because the liquid crystal molecules are rotated in one direction. The reason for this is because an apparent retardation changes depending on the direction along which the liquid crystal molecules are seen. In this case, 5° which is close to an optimal value is adopted as α. In addition, as shown in FIG. 1, the second slit-like opening 30A is formed so as to extend in parallel with the extension direction of the scanning line 18.

Next, a description will be given with respect to the light blocking member for measures taken to cope with the light leakage in the subpixel 17A for control of a view angle. As shown in a partially enlarged part of FIG. 2, in each of a central portion of a width of the second slit-like opening 30A of the upper electrode 28 in the subpixel 17A for control of a view angle, and a central portion of a width between the second slit-like openings 30A, a direction of the electric field in the ON phase of the electric field becomes approximately vertical to the alignment direction of the liquid crystal molecules in the OFF phase of the electric field. For this reason, the liquid crystal molecules in the central portion of the width of the second slit-like opening 30A, and the liquid crystal molecules in the central portion of the width between the second slit-like openings 30A are not determined in their rotational directions. For this reason, as the applied voltage is increased, as shown in FIG. 10, the light leakage having a maximum width of about 2 μm is generated in the direct vision direction. As the applied voltage is gradually increased, the light leakage is earlier generated and is generated in a longer range in the central portion of the width of the second slit-like opening 30A than in the central portion of the width between the second slit-like openings 30A.

Then, in the first embodiment, as shown in FIG. 1, a first light blocking member 40A having a predetermined width W is provided in the central portion of the width of the second slit-like opening 30A and over the entire length of the second slit-like opening 30A in terms of planar view. Since the light leakage has the width of up to 2 μm, preferably, the width W of the first light blocking member 40A for blocking the leaked light is set as being equal to or larger than 2 μm and equal to or smaller than 3 μm. When the width W of the first light blocking member 40A is set as being smaller than 2 μm, it may be impossible to perfectly prevent the light leakage in the direct vision direction. On the other hand, when the second slit-like opening 30A is set as being larger than 3 μm, the view angle control function is reduced.

It is noted that although in the first embodiment, the width W of the first light blocking member 40A is set as being equal to or larger than 2 μm and equal to or smaller than 3 μm so as to correspond to 2 μm as the maximum width of the light leakage, this results from that the width of the second slit-like opening 30A is set in the range of 5 to 6 μm. Therefore, the width W of the first light blocking member 40A may be formed so as to become half the width of the second slit-like opening 30A.

The first light blocking member 40A is formed from the same member as that of the opaque source electrode S, in the same layer as that of the opaque source electrode S, and in the same process as that of the opaque source electrode S. As a result, the first light blocking member 40A can be formed without specially adding a process. The light leakage in the central portion of the width of the second slit-like opening 30A can be reduced by the first light blocking member 40A. In addition, the first light blocking member 40A is formed in the same layer as that of the source electrode S, whereby the first light blocking member 40A is formed in the array substrate AR. Thus, even when the position shift is generated when the array substrate AR and the color filter substrate CF are stuck to each other, the position of the first light blocking member 40A, and the position of the second slit-like opening 30A can be prevented from being shifted from each other.

The array substrate AR and the color filter substrate CF which are formed in the manner as described above are made to face each other, and sealing materials (not shown) are provided in the circumferences of both the array substrate AR and the color filter substrate CF, respectively, thereby sticking both the array substrate AR and the color filter substrate CF to each other. Also, the liquid crystal is filled in a space defined between both the array substrate AR and the color filter substrate CF, thereby obtaining the liquid crystal display panel 10A according to the first embodiment. The liquid crystal display panel 10A operates in accordance with the normally black mode. Thus, as shown in FIG. 1, an optical axis (transmission axis) L1A of the first polarizing plate 14 in the array substrate AR is identical in direction to each of the scanning lines 18. Also, an optical axis L2A of the second polarizing plate 15 in the color filter substrate CF is identical in direction to each of the signal lines 19. In addition, an incident light L is radiated from a backlight unit (not shown) disposed on a back surface of the liquid crystal display panel 10A (refer to FIGS. 2 and 3).

In the display region 12A, when the thin film transistor TFT is held in an OFF state, the incident light which has been converted into a linearly polarized light in the same direction as that of each of the scanning lines 18 by the first polarizing plate 14 is made incident to the second polarizing plate 15 as it is. Therefore, the incident light cannot be transmitted through the liquid crystal display panel 10A, and thus the black display is provided. When the thin film transistor TFT is turned ON, an electric field is generated across the lower electrode 25 and the upper electrode 28, the alignment of the liquid crystal molecules of the liquid crystal layer LC changes, and the light passing through the liquid crystal layer LC is given a predetermined phase difference (½ wavelength). As a result, since the incident light which has been converted into the linearly polarized light parallel with each of the scanning lines 18 by the first polarizing plate 14 is changed in phase by 90°, and is then made incident to the second polarizing plate 15, the incident light can pass through the liquid crystal display panel 10A. Thus, the chromatic color display can be carried out through the color filter layer 35.

When the thin film transistor TFT is held in the OFF state, since the liquid crystal molecules located within the second slit-like opening 30A in the subpixel 17A for control of a view angle are parallel with the plane of the array substrate AR, no light leakage is generated in the direct vision direction and in the eye squinting direction for the liquid crystal display panel 10A. Therefore, no influence is exerted on the display in the display region 12A. When the thin film transistor TFT is turned ON, the electric field is generated across the lower electrode 25 and the upper electrode 28. Thus, as shown in the partially enlarged part of FIG. 2, the liquid crystal molecules located within the second slit-like opening 30A in the sub-pixel 17A for control of a view angle are inclined with respect to the plane of the array substrate AR. As a result, the incident light radiated from the backlight light source leaks in the inclination direction. For this reason, with the exception of the light leakage described above, no influence of the display is exerted on the direct vision direction for the liquid crystal display panel 10A. However, the contrast becomes deteriorated for the eye squinting direction for the liquid crystal display panel 10A, and thus an image becomes difficult to visibly recognize.

2. Second Embodiment

Figure 4:
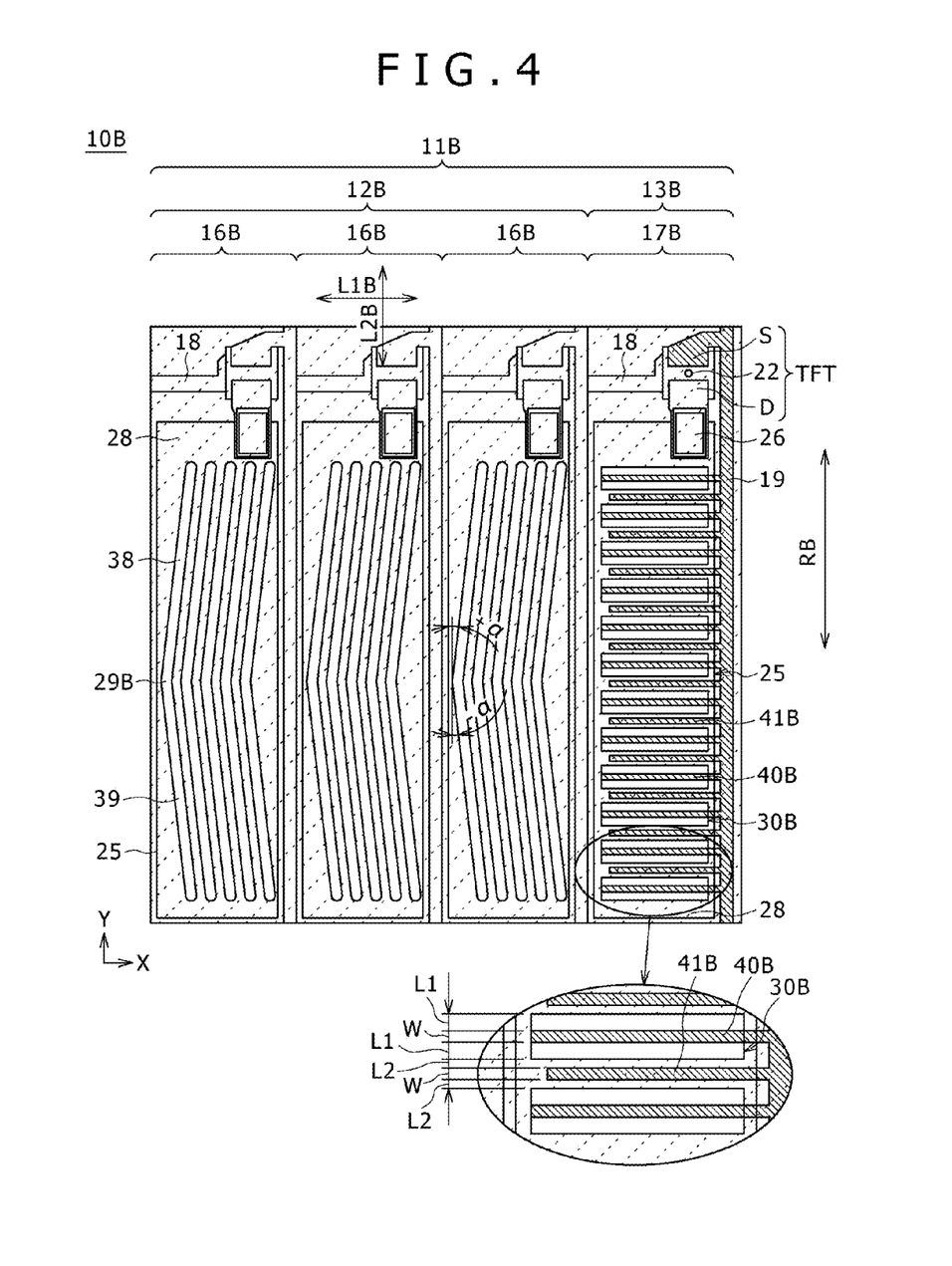
FIG. 4 is a top plan view showing an outline of an array substrate for one pixel in a liquid crystal display panel according to a second embodiment.

Next, a liquid crystal display panel 10B according to a second embodiment will be described in detail with reference to FIG. 4. FIG. 4 corresponds to FIG. 1 showing the liquid crystal display panel 10A of the first embodiment. In the liquid crystal display panel 10B of the second embodiment, the same constituent elements as those in the liquid crystal display panel 10A of the first embodiment in terms of a structure are designated by the same reference numerals, respectively. With regard to the reference numerals each having a suffix A added thereto, the suffix A is changed to a suffix "B," and a detailed description of the constituent elements each having the suffix B added thereto is omitted here for the sake of simplicity. The liquid crystal display panel 10B of the second embodiment is mainly different in width of the light blocking member from the liquid crystal display panel 10A of the first embodiment.

As shown in FIG. 4, a first light blocking member 40B of the liquid crystal display panel 10B of the second embodiment extends up to the signal line 19, and has the same potential as that of the signal line 19. Also, a second light blocking member 41B is formed in a position as well of a central portion of a width between second slit-like openings 30B in terms of planar view. Similarly to the case of the first light blocking member 40B, the second light blocking member 41B is formed from the same member as that of the source electrode S, in the same layer as that of the source electrode S, and in the same process as that of the source electrode S so as to have a width equal to or larger than 2 μm and equal to or smaller than 3 μm. Also, the second light blocking member 41B extends up to the signal line 19 and has the same potential as that of the signal line 19.

As described above, in the liquid crystal display panel 10B of the second embodiment, since the light leakage between the second slit-like openings 30B can also be blocked, the light leakage in the direct vision direction can be further reduced. It is noted that since the length of the light leakage between the second slit-like openings 30B is shorter than that of the light leakage in the central portion of the width of the second slit-like opening 30B, the length of the second light blocking member 41B is shorter than that of the first light blocking member 40B. As a result, it is possible to effectively carry out the view angle control, and it is also possible to enhance the effect of preventing the light leakage in the direct vision direction.

3. Third Embodiment

Figure 5:
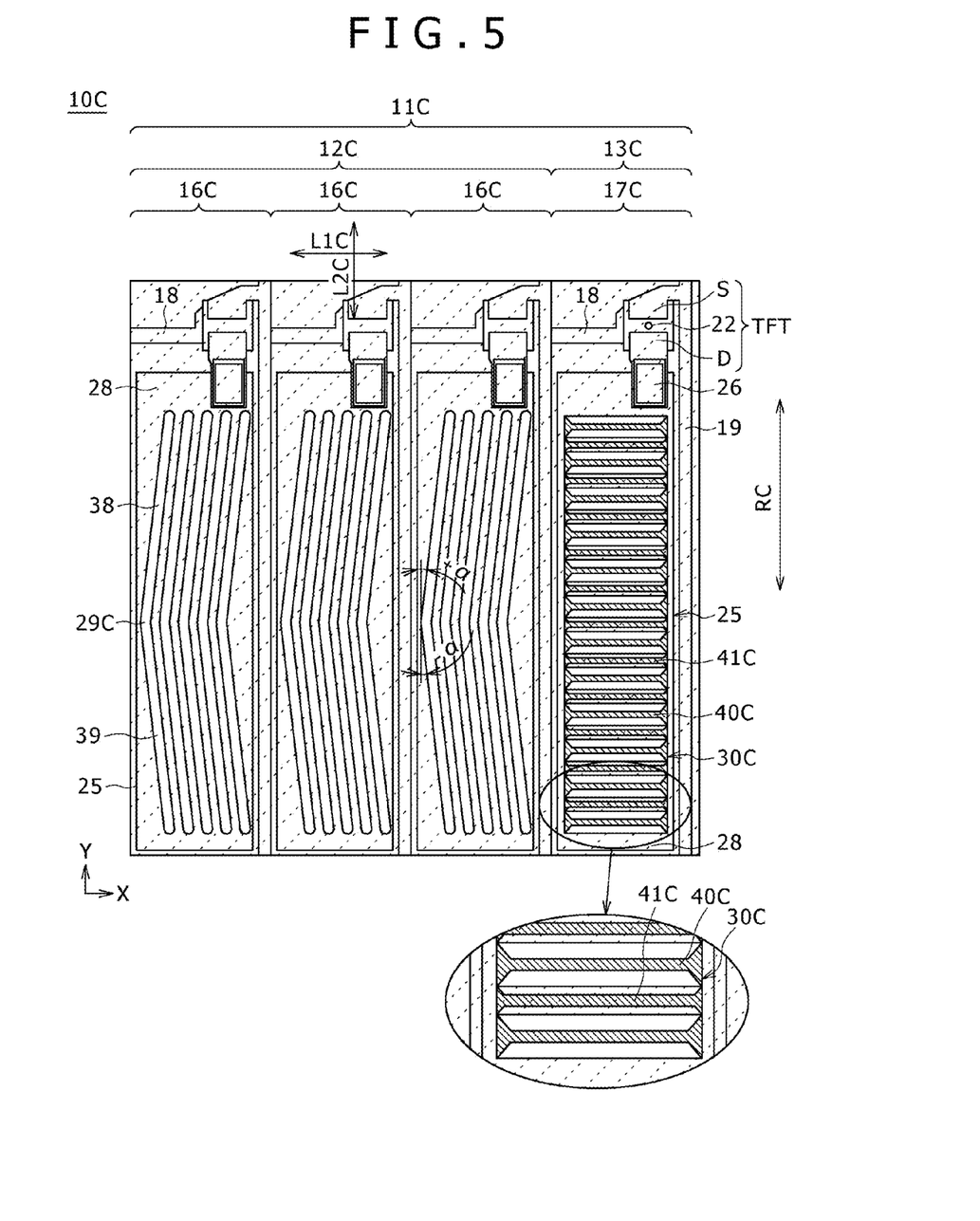
FIG. 5 is a top plan view showing an outline of an array substrate for one pixel in a liquid crystal display panel according to a third embodiment.

Next, a liquid crystal display panel 10C according to a third embodiment will be described in detail with reference to FIG. 5. It is noted that in FIG. 5, an illustration of the first alignment film is omitted. FIG. 5 corresponds to FIG. 1 showing the liquid crystal display panel 10A of the first embodiment. In the liquid crystal display panel 10C of the third embodiment, the same constituent elements as those in the liquid crystal display panel 10A of the first embodiment in terms of a structure are designated by the same reference numerals, respectively. With regard to the reference numerals each having a suffix A added thereto, the suffix A is changed to a suffix "C," and a detailed description of the constituent elements each having the suffix C added thereto is omitted here for the sake of simplicity. The liquid crystal display panel 10C of the third embodiment is mainly different in width of the light blocking member from the liquid crystal display panel 10A of the first embodiment.

As shown in FIG. 5, the both ends of the first light blocking member 40C of the liquid crystal display panel 10C of the third embodiment gradually spread up to the positions of entire ridge lines of end portions of a second slit-like opening 30C in terms of planar view. Also, a second light blocking member 41C is formed in a position as well of a central portion of a width between the second slit-like openings 30C in terms of planar view. The second light blocking member 41C is provided in a position of a central portion of a width of a second slit-like opening 30C over the entire length of the second slit-like opening 30C so as to have a width equal to or larger than 2 μm and equal to or smaller than 3 μm in terms of planar view similarly to the case of the first light blocking member 40C. The second light blocking member 41C is formed from the same member as that of the source electrode S, in the same layer as that of the source electrode S, and in the same process as that of the source electrode S. Also, the both ends of the second light blocking member 41C gradually spread up to the positions of the entire ridge lines of the end portions of the slit-like opening 30C in terms of planar view. As described above, in the liquid crystal display panel 10C of the third embodiment, the both end portions of the second slit-like opening 30C in which the direction of the electric field is different from that of the rubbing treatment are also light-blocked. Therefore, it is possible to further reduce the light leakage in the direct vision direction.

4. Fourth and Fifth Embodiments

Figure 6A:
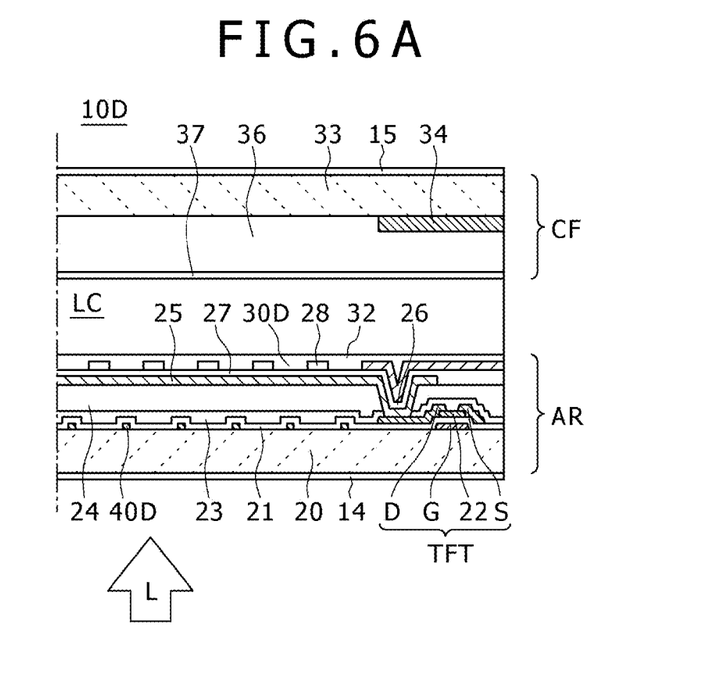
FIGS. 6A and 6B are, respectively, a cross sectional view of a portion corresponding to the cross sectional view taken on line II-II of FIG. 1 in a liquid crystal display panel according to a fourth embodiment, and a cross sectional view of a portion corresponding to the cross sectional view taken on line II-II of FIG. 1 in a liquid crystal display panel according to a fifth embodiment.
Figure 6B:
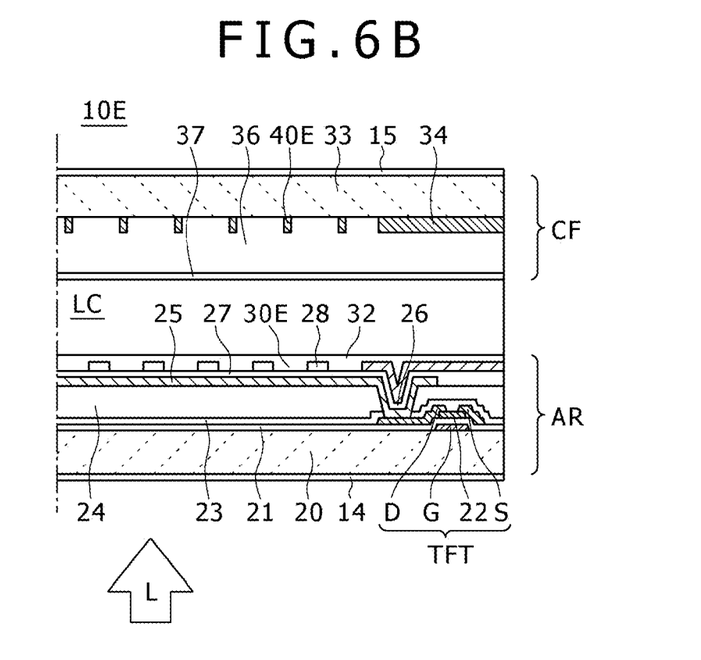

Next, liquid crystal display panels 10D and 10E according to fourth and fifth embodiments will be described with reference to FIGS. 6A and 6B, respectively. FIG. 6A corresponds to the cross sectional view showing a subpixel 17D for control of a view angle of FIG. 2 in the liquid crystal display panel 10D of the fourth embodiment. FIG. 6B corresponds to the cross sectional view showing the subpixel 17E for control of a view angle of FIG. 2 in the liquid crystal display panel 10E of the fifth embodiment. In the liquid crystal display panels 10D and 10E of the fourth and fifth embodiments, the same constituent elements as those in the liquid crystal display panel 10A of the first embodiment in terms of a structure are designated by the same reference numerals, respectively. With regard to the reference numerals each having the suffix A added thereto, the suffix A is changed to a suffix "D" in the case of the fourth embodiment and the suffix A is changed to a suffix "E" in the case of the fifth embodiment. Also, a detailed description of the constituent elements each having the suffix D added thereto and a detailed description of the constituent elements each having the suffix E added thereto are omitted here for the sake of simplicity. Each of the fourth and fifth embodiments is different in position where the light blocking member is formed and material thereof from the liquid crystal display panel 10A of the first embodiment in terms of a structure.

As shown in FIG. 6A, a first light blocking member 40D in the liquid crystal display panel 10D of the fourth embodiment is formed from the same member as that of the opaque gate electrode G, in the same layer as that of the opaque gate electrode G, and in the same process as that of the opaque gate electrode G. The first light blocking member 40D in the fourth embodiment is formed in the array substrate AR similarly to the case of the first light blocking member 40A in the first embodiment. Therefore, in the case where when the array substrate AR and the color filter substrate CF are stuck to each other and their positions are shifted from each other, the position of the first light blocking member 40D, and the position of the second slit-like opening 30D are prevented from being shifted from each other.

As shown in FIG. 6B, a first light blocking member 40E of the liquid crystal display panel 10E of the fifth embodiment is formed from the same member as that of the opaque light blocking layer 34 of the color filter substrate CF, in the same layer as that of the opaque light blocking layer 34 of the color filter substrate CF, and in the same process as that of the opaque light blocking layer 34 of the color filter substrate CF. As has been described, even when the first light blocking member 40E is formed in the same process as that of the gate electrode G, or in the same process as that of the light blocking layer 34 of the color filter substrate CF, it is possible to prevent the number of processes for forming the first light blocking member 40E from being increased. It is noted that the second light blocking member can also be formed on the gate electrode G or in the color filter substrate CF.

5. Sixth Embodiment

Figure 7:
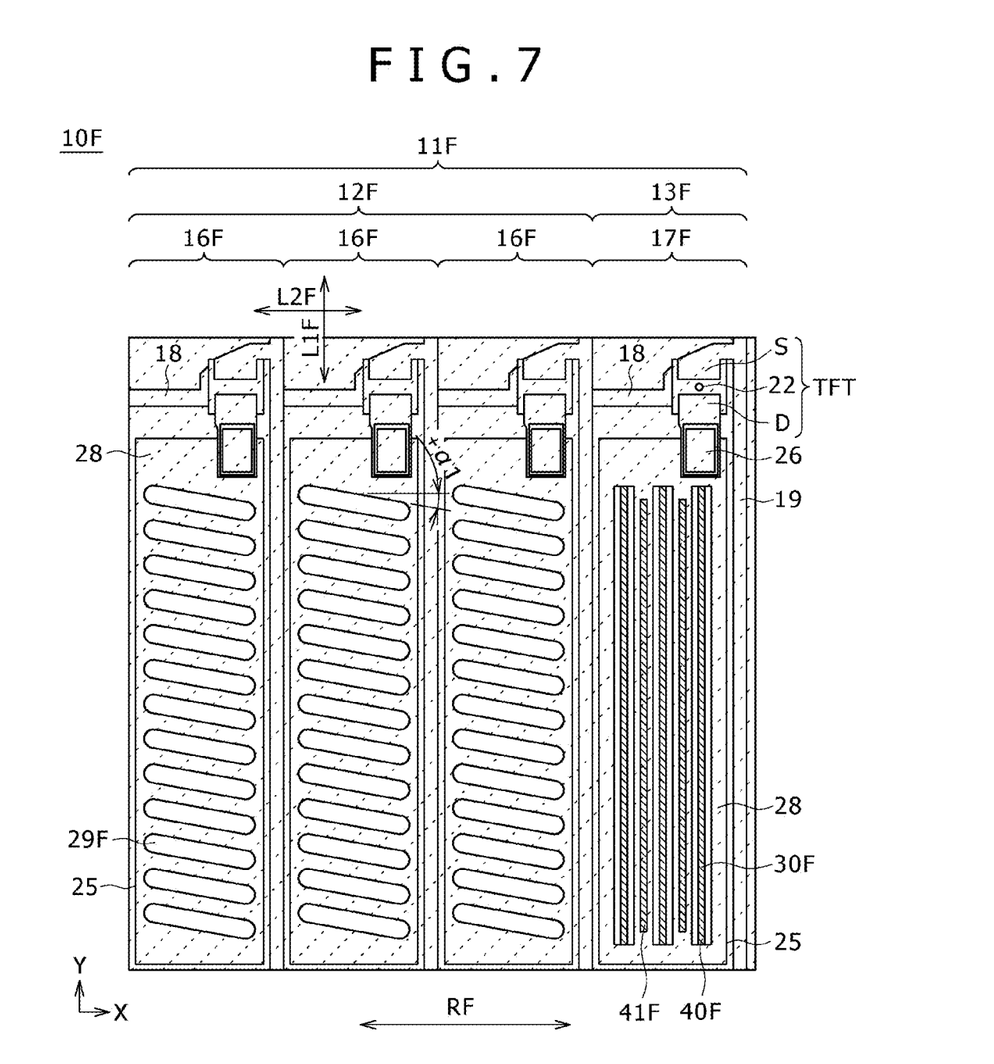
FIG. 7 is a top plan view showing an outline of an array substrate for one pixel in a liquid crystal display panel according to a sixth embodiment.

Next, a liquid crystal display panel 10F according to a sixth embodiment will be described with reference to FIG. 7. FIG. 7 corresponds to FIG. 1 showing the liquid crystal display panel 10A of the first embodiment. In the liquid crystal panel 10F of the sixth embodiment, the same constituent elements as those in the liquid crystal display panel 10A of the first embodiment in terms of a structure are designated by the same reference numerals, respectively. With regard to the reference numerals each having the suffix A added thereto, the suffix A is changed to a suffix "F," and a detailed description of the constituent elements each having the suffix F added thereto is omitted here for the sake of simplicity. The liquid crystal display panel 10F of the sixth embodiment is mainly different from the liquid crystal display device 10A of the first embodiment in that the extension direction of each of the second slit-like openings 30A of the view angle control region 13A in the first embodiment is parallel with each of the scanning lines 18, whereas an extension direction of each of second slit-like openings 30F of a view angle control region 13F in the sixth embodiment is parallel with each of the signal lines 19.

In the liquid crystal display panel 11F of the sixth embodiment, the extension direction of a first slit-like opening 29F of the display region 12F is not of a multi-domain type, but is inclined with respect to each of the scanning lines 18 by an angle +α1. Also, the extension direction of the second slit-like opening 30F of the view angle control region 13F is parallel with each of the signal lines 19. A first light blocking member 40F of the view angle control region 13F is provided in a position of a central portion of a width of the second slit-like opening 30F over the entire length of the second slit-like opening 30 so as to have a width equal to or larger than 2 μm and equal to or smaller than 3 μm in terms of planar view similarly to the case of the first embodiment. Also, the first light blocking member 40F is formed from the same member as that of the source electrode S, in the same layer as that of the source electrode S, and in the same process as that of the source electrode S. In addition, a second light blocking member 41F is formed in a position between the second slit-like openings 30F so as to be slightly shorter than the entire length of the second slit-like opening 30F and so as to have a thickness equal to or larger than 2 μm and equal to or smaller than 3 μm in terms of planar view. Also, the second light-blocking member 41F is formed from the same member as that of the source electrode S, in the same layer as that of the source electrode S, and in the same process as that of the source electrode S. As has been described, the present invention can be applied to the liquid crystal display panel as well in which the slit-like opening of the view angle control region is parallel with each of the signal lines 19.

6. Seventh Embodiment

Figure 8:
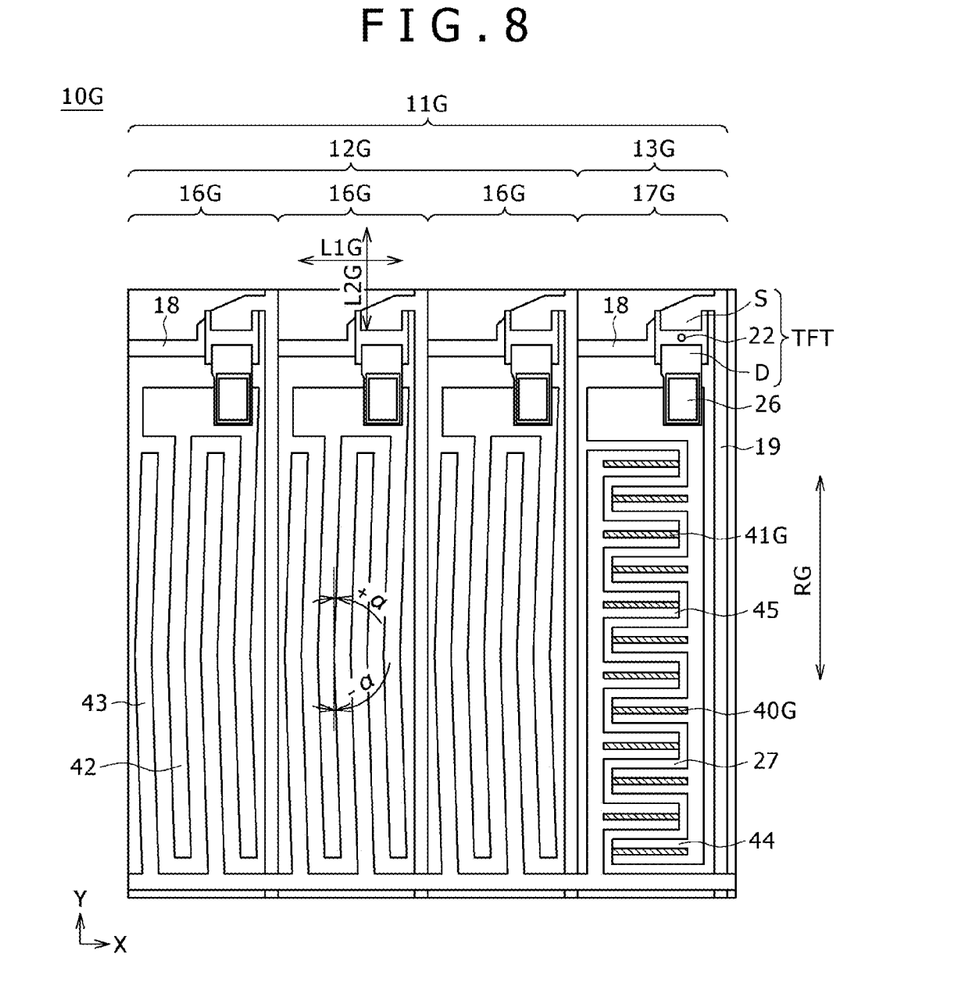
FIG. 8 is a top plan view showing an outline of an array substrate for one pixel in a liquid crystal display panel according to a seventh embodiment.

Next, a liquid crystal display panel 10G according to a seventh embodiment will be described with reference to FIG. 8. FIG. 8 corresponds to FIG. 1 showing the liquid crystal display panel 10A of the first embodiment. In the liquid crystal panel 10G of the seventh embodiment, the same constituent elements as those in the liquid crystal display panel 10A of the first embodiment in terms of a structure are designated by the same reference numerals, respectively. With regard to the reference numerals each having the suffix A added thereto, the suffix A is changed to a suffix "G," and a detailed description of the constituent elements each having the suffix G added thereto is omitted here for the sake of simplicity. The liquid crystal display panel 10G of the seventh embodiment is mainly different from the liquid crystal display device 10A of the first embodiment in that the liquid crystal display panel 10A of the first embodiment has the FFS mode, whereas the liquid crystal display panel 10G of the seventh embodiment has the IPS mode.

As shown in FIG. 8, in the liquid crystal display panel 10G of the seventh embodiment, the first electrode 42 (corresponding to the first electrode in the present invention) operating as the pixel electrode in the display region 12G, and the second electrode 43 (corresponding to the second electrode in the present invention) operating as the common electrode have slot-like openings, respectively. Also, the first electrode 42 and the second electrode 43 are formed in slender pectinate shapes each having a dogleg shape and extend so as to make at angles of +α and −α with each of the signal lines 19, respectively. Thus, the first electrode 42 and the second electrode 43 are formed in a form such that the other electrode is formed in the slit-like opening of one electrode, and thus one electrode and the other electrode are engaged with each other in terms of planar view. The first electrode 44 operating as the pixel electrode of the view angle control region 13G, and the second electrode 45 operating as the common electrode are formed so as to have a pectinate shape having a plurality of slit-like openings in the direction (in the X-axis direction) of each of the scanning lines 18. Thus, the first electrode 44 and the second electrode 45 are formed in a form such that the other electrode is formed in the slit-like opening of one electrode, and thus one electrode and the other electrode are engaged with each other in terms of planar view.

Also, as shown in FIG. 8, a first light blocking member 40G is formed in a position of a central portion of a width of the slit-like opening of the second electrode 45, in other words, in a position of a central portion of a width of the first electrode 44 over the entire length of the first electrode 44 so as to have a width equal to or larger than 2 μm and equal to or smaller than 3 μm in terms of planar view. Also, a second light blocking member 41G is formed in a position of a central portion of a width of the slit-like opening of the first electrode 44, in other words, in a position of a central portion of a width of the second electrode 45 over the entire length of the second electrode 45 so as to have a width equal to or larger than 2 μm and equal to or smaller than 3 μm in terms of planar view. In the manner as shown in FIG. 6B, each of the first light blocking member 40G and the second light blocking member 41G is formed from the same member as that of the opaque light blocking layer 34 of the color filter substrate CF, in the same layer as that of the opaque light blocking layer 34 of the color filter substrate CF, and in the same process as that of the opaque light blocking layer 34 of the color filter substrate CF.

7. Eighth Embodiment

The liquid crystal display panel has been described so far in the form of the first to seventh embodiments. Such a liquid crystal display panel of the present invention can be used in various kinds of electronic apparatuses such as a personal computer, a mobile phone, a handheld terminal, and a car navigation system.

An electronic apparatus according to an eighth embodiment includes the liquid crystal display panel according to any one of the first to seventh embodiments.

It is noted that since the basic configurations of these various kinds of electronic apparatuses are well known to those skilled in the art, a detailed description thereof is omitted here for the sake of simplicity.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A transmissive liquid crystal display panel, comprising:
   a first substrate and a second substrate disposed so as to face each other with a liquid crystal layer being held between said first substrate and said second substrate;
   a first electrode and a second electrode across which an electric field is applied to said liquid crystal layer being formed on the first substrate;
   a subpixel for display; and
   a subpixel for control of a view angle being disposed on a same pixel,
   wherein a plurality of slit-like openings are formed in said second electrode made of a transparent conductive material in a view angle control region of said subpixel for control of a view angle,
   wherein a light blocking member is disposed on a different layer than that of the second electrode,
   wherein in a planar view the light blocking member is arranged in an area to occupy a part of each of the slit-like openings and is formed in a central position of a width of each of the slit-like openings.

2. The liquid crystal display panel according to claim 1, wherein said light blocking member is formed in a central position as well of a width of said second electrode in terms of planar view.

3. The liquid crystal display panel according to claim 1, wherein said first electrode is formed on a lower side of said first substrate through an insulating layer, and said second electrode is formed on an upper side of said first substrate.

4. The liquid crystal display panel according to claim 1, wherein a thin film transistor for driving either said first electrode or said second electrode is formed on said first substrate, and said light blocking member is formed in the same layer as that of either a source electrode or a gate electrode of said thin film transistor.

5. The liquid crystal display panel according to claim 1, wherein a light blocking layer is formed on said second substrate, and said light blocking member is formed in the same layer as that of said light blocking layer.

6. The liquid crystal display panel according to claim 1, wherein a length of said light blocking member in a position where corresponding one of said slit-like openings of said second electrode is longer than that of said light blocking member formed on a surface between corresponding ones of said slit-like openings of said second electrode.

7. An electronic apparatus comprising:
   a transmissive liquid crystal display panel including
      a first substrate and a second substrate disposed so as to face each other with a liquid crystal layer being held between said first substrate and said second substrate,
      a first electrode and a second electrode across which an electric field is applied to said liquid crystal layer being formed on the first substrate, a subpixel for display and a subpixel for control of a view angle being disposed on a same pixel,
   wherein a plurality of slit-like openings are formed in said second electrode made of a transparent conductive material in a view angle control region of said subpixel for control of a view angle,
   wherein a light blocking member is disposed on a different layer than that of the second electrode,
   wherein in a planar view the light blocking member is arranged in an area to occupy a part of each of the slit-like openings and is formed in a central position of a width of each of the slit-like openings.

8. The liquid crystal display panel according to claim 1, wherein the light blocking member has a length that is substantially the same as a length of a long side of each of the slit-like openings, and
   wherein the light blocking member has a width that is shorter than a length of a short side of each of the slit-like openings.

* * * * *